(12) United States Patent
Stefano et al.

(10) Patent No.: US 12,050,672 B2
(45) Date of Patent: Jul. 30, 2024

(54) BIOMETRIC VERIFICATION USING CHARACTERISTIC ELECTROPHYSIOLOGICAL FEATURES

(71) Applicant: IDENTITA INC., Concord (CA)

(72) Inventors: Rocco Stefano, Concord (CA); Hirad Karimi, Concord (CA)

(73) Assignee: IDENTITA, INC., Ontario (CA)

( * ) Notice: Subject to any disclaimer, the term of this patent is extended or adjusted under 35 U.S.C. 154(b) by 279 days.

(21) Appl. No.: 17/480,296

(22) Filed: Sep. 21, 2021

(65) Prior Publication Data

US 2023/0086822 A1 Mar. 23, 2023

(51) Int. Cl.
G06F 21/32 (2013.01)
G06F 18/28 (2023.01)
G06N 20/10 (2019.01)

(52) U.S. Cl.
CPC .............. *G06F 21/32* (2013.01); *G06F 18/28* (2023.01); *G06N 20/10* (2019.01)

(58) Field of Classification Search
None
See application file for complete search history.

(56) References Cited

U.S. PATENT DOCUMENTS

| | | | |
|---|---|---|---|
| 8,924,736 B1 | 12/2014 | Dusan et al. | |
| 9,699,182 B2 * | 7/2017 | El Saddik | A61B 5/117 |
| 2019/0184853 A1 * | 6/2019 | Thomas | B60R 22/48 |

OTHER PUBLICATIONS

Nikita Samarin, A Key to Your Heartbeat, Biometric Authentication Based on ECG Signals (Year: 2018).*
Akansu, Ali N. et al., Perfect Reconstruction Binomial QMF-Wavelet Transform, SPIE Proceedings 1360, Visual Communications and Image Processing '90, (published Sep. 1, 1990), pp. 609-618.
Kim, Ho J. et al., Study on a Biometric Authentication Model Based on ECG Using a Fuzzy Neural Network, IOP Conference Series: Materials Science and Engineering vol. 317, published 2018, pp. 1-10.
Pan, J. and Tompkins, W., a Real-Time QRS Detection Algorithm, IEEE Transactions on Biomedical Engineering, vol. BME-32, No. 3, Mar. 1985, pp. 230-236.
Samarin, N., a Key to Your Heart: Biometric Authentication Based on ECG Signals, Project Report, Computer Science School of Informatics University of Edinburgh, published 2018, pp. 1-62.
Savitzky, A. et al., Smoothing and Differentiation of Data by Simplified Least Squares Procedures, Analytical Chemistry, vol. 36, No. 8, Jul. 1964, pp. 1627-1639.
Fletcher, T., Support Vector Machines Explained, University College London, Department of Computer Science, published Dec. 23, 2008, pp. 1-18.

* cited by examiner

*Primary Examiner* — Cai Y Chen

(57) ABSTRACT

A method and device for using ECG signals for biometric authorization that includes a machine-learning based signal processing approach for significantly removing noise signals from ECG signals being used. The present invention further includes a probability-based additional approach for further enhancing the signal relative to signal segments falsely identified as an actual ECG signal.

21 Claims, 12 Drawing Sheets

BIOMETRIC VERIFICATION USING CHARACTERISTIC ELECTROPHYSIOLOGICAL FEATURES

FIELD OF THE INVENTION

The present invention generally relates to biometrics, and more particularly relates to identification and identity authentication using biometric information.

BACKGROUND OF THE INVENTION

Biometrics relates to measuring and analyzing unique (from individual to individual) features of the human body such as fingerprints, retina vein patterns, irises, voice patterns, facial structure, and hand/finger measurements for either identify authentication (i.e., one-to-one verification—"Am I who I claim I am?"), or identification (i.e., one-from-many identification—"Who am I?") purposes.

A particular use of biometric authentication is to provide a more secure identity authentication, compared with, for example, access badges (which can be lost or stolen) or pass codes (which can be forgotten, or used by someone other than an authorized individual).

Generally, biometric systems include capture devices to acquire biometric information, software algorithms for effective authentication/identification, and databases that store reference biometric data for comparison.

In a known generic biometric authentication process, biometric data is generated first by a step of enrollment in which a biometric characteristic, is captured by an appropriate sensor. The captured information is then mathematically transformed into a numerical model called a reference template. The mathematical transformation may be conventional in the art, as specified in, for example, American National Standard for Information Technology—"Finger Minutiae Format for Data Interchange": ANSI INCITS 378-2004 and its revisions (in the case of using fingerprint information).

Thereafter, one or more reference templates are stored in a conventional computer database as data files. The reference templates are sometimes known in the art as "gallery" templates. For the sake of simplicity in the present application, they will be referred to herein simply as reference templates.

For authentication (i.e., proof of identity), an individual presents his biometric characteristic by way of an appropriate detector or reader (e.g., if the information is fixed in a recording of some type). The detected biometric characteristic is then mathematically transformed into an input template (sometimes known in the art as a "probe" template) using the same transformation for creating the reference template, thereby creating an input template that can be compared with a respective stored reference template to confirm or reject the identity of the individual. The process of identification is similar to authentication, but the input template instead is compared against a plurality of stored reference templates to try to find a match.

It is known in the art that the reliability of matching between an input template and reference template can vary, depending on a number of factors. For example, fingerprints are comparatively invariable, even as a person ages. Thus, barring external alteration or disfigurement, both input and reference templates can be recorded with relative precision, and subsequent matching can usually performed with a relatively high degree of reliability. However, fingerprints can be copied (from fingerprints left on other objects, for example), and can be thus misused.

On the other hand, certain biometric parameters are inherently dynamic, such as retinal vein patterns, facial feature recognition, or voice pattern recognition. While they present certain lasting features which can form the basis for biometric authentication comparison, they can be variable (to varying degrees) at any given moment. For example, retinal veins have blood flowing through them which can change the shapes of the blood vessels. Facial feature topography can vary as a person ages, causing distances between given reference points to vary. Voice patterns may be variable at any moment (during a cold or a sore throat). Thus, the comparison between the input and reference templates is subject to variation that makes matching more difficult.

It is generally known to use electrocardiograms ("ECGs") for biometric identification purposes. See, for example, U.S. Pat. No. 9,699,182 of El Saddik et al. (for "Electrocardiogram (ECG) Biometric Authentication," issued on Jul. 4, 2017).

As is known, the human heart regularly contracts and relaxes (i.e., "beats") in correspondence with a regular electric impulse generated in the heart muscle (generally, from the sinoatrial node to the atrioventricular node to the His-Purkinje Network). The electrical signal is externally detectable via ECG at the skin in a known manner, typically (but not exclusively) using one or more electrodes positioned on the human torso (and sometimes also on the extremities). This signal can generate a characteristic potential versus time trace representing a given heartbeat (as generically illustrated in FIG. 1, by way of illustration).

However, this varying electrical signal can be detected elsewhere on the exterior of the body (i.e., the skin surface), including, for example, the fingertips. This can greatly facilitate ECG detection, in comparison to a more invasive use of electrodes on the torso (requiring some degree of disrobing, increased inconvenience of placing and removing a plurality of electrodes, etc.). Another increasingly popular option is detection via wearable personal devices (e.g., via "smartwatches" and the like).

FIG. 1 generally illustrates one full heartbeat waveform signal (and part of a second) as represented by an ECG trace (generally, electrical potential along the Y-axis relative to time along the X-axis). A given heartbeat (as recorded by ECG) includes P, QRS, and T complexes, as shown in FIG. 1. As is well-known in physiology, the P wave represents the start of electrical depolarization of the sinus node and the sequential right and left atrial contraction, the QRS complex signifies the electrical depolarization of the right and left ventricles, and the T wave corresponds to the electrical repolarization of the ventricles.

The Q, R, and S waves occur in rapid succession, and are considered to reflect a single collective event and thus are usually considered together as the "QRS complex" or "QRS interval." A Q wave is any downward deflection after the P wave. An R wave follows as an upward deflection, the S wave is any downward deflection after the R wave, and the T wave follows the S wave. These relationships can be seen in FIG. 1.

The signal features illustrated in FIG. 1 are generally common in all human heartbeats. Obviously, cardiac behavior (and the resultant ECG traces) can change under the influence of stress, disease, physical exercise, medications, etc. As a result, an electrocardiogram for even the same person may vary at different times (i.e., have variations in potential changes and/or time durations). FIG. 2 schematically illustrates ECG signals taken from a plurality of different individuals, showing comparative variations therebetween. An average (i.e., an average electrical potential at a given time) of the samples is also illustrated by the bold black dashed line 20.

The electrical signal detectors (electrodes) used for ECG may also register electrical noise anomalies (i.e., false or errant signals) that can interfere with obtaining a usable signal for use. In particular, the detecting electrodes can be prone to detecting electrical noise from musculature other than the heart or from movement of the fingers/fingertips contacting the detecting electrodes. This can add extraneous signal spikes to the detected signal.

FIG. 3 schematically illustrates a plurality of actual QRS samples (generally indicated at 30, and generally conforming to the waveform illustrated in FIG. 1) versus false detected anomalies (some representative ones indicated at 32).

Thus, while ECG information contains unique information that can be used for biometric authorization/identification, a given sample of ECG information is subject to variations, and detection of ECG information can be subject to extrinsic noise or other false inputs.

SUMMARY OF THE INVENTION

The present invention is therefore directed to a system and method of biometric authentication based on ECG information. In particular, the system and method of the present invention uses a method of dynamic machine learning to improve reliable and robust extraction of ECG information from detected signals. In a preferred example of the present invention, a highly portable and easy to produce input device can be used to detect individual ECG information.

In one embodiment of the present invention, a support vector machine is trained for use as a classifier. In another embodiment of the present invention, a neural network is used for classification.

BRIEF DESCRIPTION OF THE DRAWINGS

The present invention will be even more clearly understood with reference to the drawings appended hereto, in which.

DETAILED DESCRIPTION OF THE PRESENT INVENTION

Figure 4:
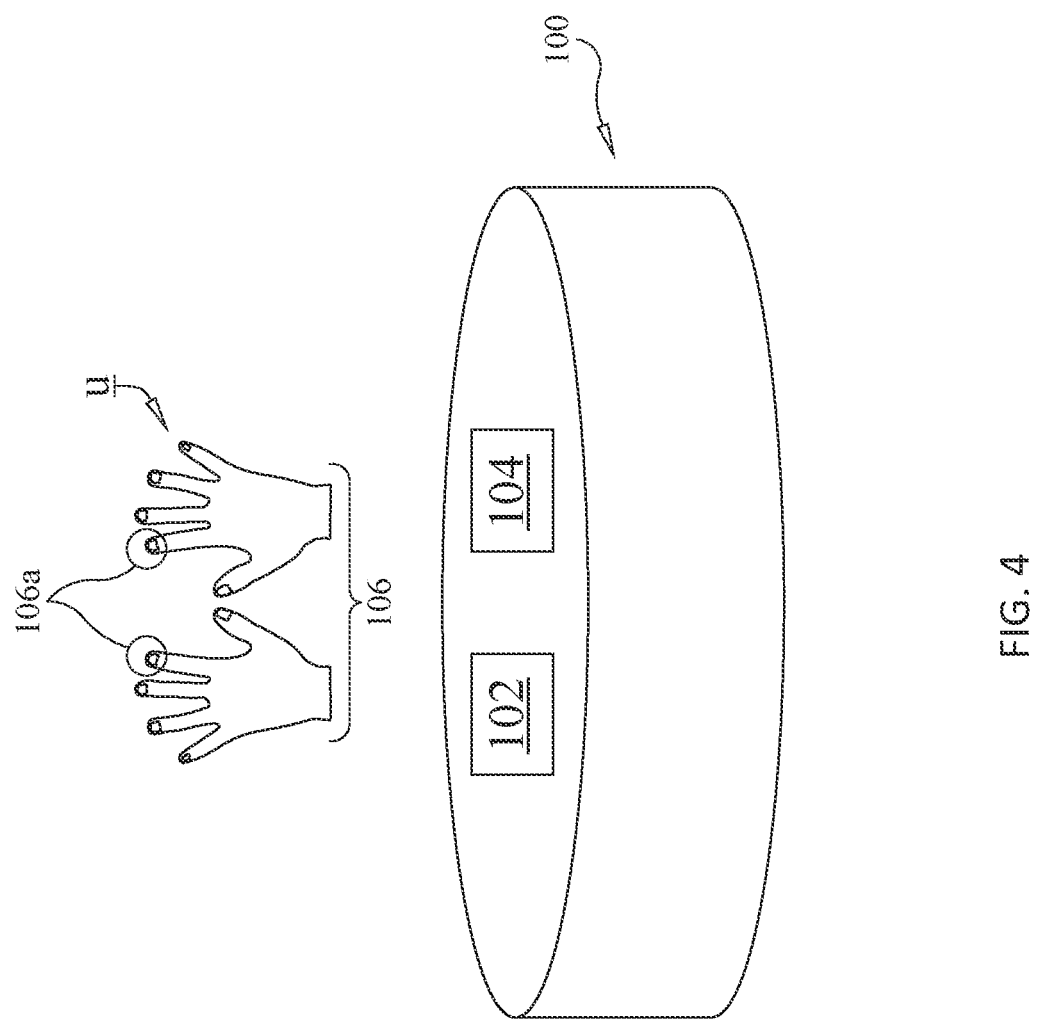
FIG. 4 is a schematic view of an interface apparatus usable according to the present invention for detecting an ECG signal from a user.

FIG. 4 schematically illustrates an example of a standalone user interface apparatus 100 usable according to the present invention. In general, ECG information is collected from a user U by touching electrically conductive contacts (e.g., electrodes) 102, 104 respectively with a fingertip 106a from each hand 106. The contacts 102, 104 may be preferably relatively small (for example, 1 cm$^2$ by 1 cm$^2$) in order to contribute to miniaturization of the overall apparatus 100. They may be conventional metallic contact surfaces (made of a sufficiently conductive metal material). Patches of electrically conductive ink or graphene could be also used (which lends itself to simplicity of manufacture, by using known ink and 3D printing methods). A commercially available example of a detection device of this general nature (though not necessarily substantively corresponding to apparatus 100) is the "KardiaMobile" two-pad detection device from AliveCor. Alternatively, a single contact as described can be provided and still be usable according to the present invention. However, two or more contacts (or, more generally, inputs) in this sense are generally preferable in terms of resultant improvement in ECG signal detection.

In general, the interface apparatus 100 is preferably compact, and includes an internal electronic architecture that is simple, reliable, preferably with relatively low power consumption. For example, a 3-5 year operational life on battery power (though this is usage dependent) is a desirable target. For convenience, battery storage (e.g., 800 mAh) may be rechargeable using simple conventional means, such as a USB (particularly, a micro USB) connection to power. In general, the interface apparatus 100 can be used both for initial enrollment as well as for each identification/authentication instance. Obviously, however, more than one appropriately networked (or otherwise operably connected) interface devices 100 can be used as may be desired. Also, the "puck" like embodiment in FIG. 4 is merely one example of an interface form.

Figure 4A:
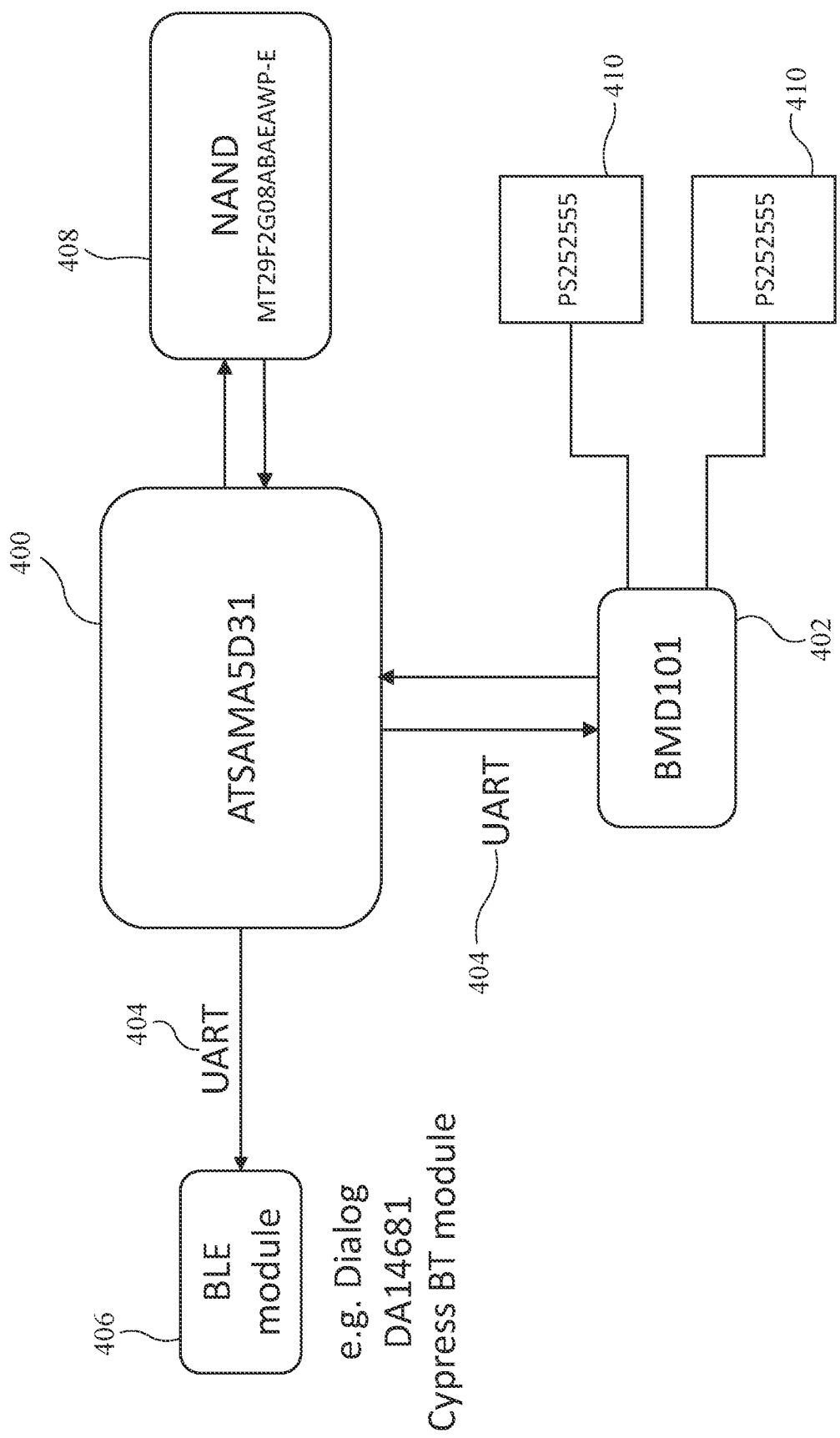
FIG. 4A is a schematic block diagram of the operational elements of the interface apparatus in FIG. 4.

As seen in FIG. 4A, required processing may be provided by an ARM (Advanced RISC Machine) microprocessor 400 (e.g., the low-power ATSAMA5D31 microprocessor from Microchip, supporting a variety of Secure Hash Algorithm protocols such as SHA-256 and AES-256/512 hashing and encryption functionality (in particular to protect and secure enrolled reference templates as well as detected biometric information).

The interface apparatus further includes a bio-sensor 402 for processing the detected ECG signals, such as the commercially available NeuroSky BMD101 CardioChip biosensor providing digital signal processing functionality. The bio-sensor 402 communicates with the microprocessor 400, for example, via a Universal Asynchronous Receiver/Transmitter (UART) 404, as is conventionally known. A low-energy Bluetooth transceiver module 406 (e.g., a Dialog DA14681 module from Dialog Semiconductor in the United Kingdom, or a Cypress Bluetooth module from Cypress Semiconductor) provides wireless communication capability with other relevant systems (e.g., locking systems). The Bluetooth transceiver module also communicates with the microprocessor 400 via a UART 404. Memory capacity can be provided by a flash memory 408, such as a NAND flash memory (e.g., MT29F2G08ABAEAWP-E from Micron Technology).

The electrode sensors 410 in interface apparatus 100 (corresponding with 102, 104 in FIG. 4) may be commercially available sensors (for example, from Plessey Semiconductors, Ltd. in the United Kingdom, Part No. PS252555).

The interface apparatus 100 may be configured to use a known commonly used operating system, as needed, such as, without limitation, Linux, Windows, Mac OS/X, or Android OS. The interface apparatus 100 may be connected to related systems in a known manner either wirelessly (e.g., via Bluetooth protocols) or via a USB connection.

Alternatively, standard medical electrodes applied to the torso (and, possibly, additionally the extremities) could be used according to known ECG methods in order to record ECG information from user U. A single contact input could be used, but use of at least two contacts is preferable with respect to providing a better quality signal.

In a specific example of the present invention, it is possible at any given moment that a given user unexpectedly cannot be identified or authenticated via the basic ECG-based system of the present invention due to an unanticipated technical problem. It can therefore desirable according to the present invention to use an electrically capacitive material for the contacts 102, 104 so that the contacts 102, 104 can do double duty as fingerprint readers in addition to detecting an ECG signal. The thusly read fingerprint(s) can serve as a backup biometric identification/authentication parameter in case the ECG comparison cannot be carried out, or if the ECG comparison detects a partial discrepancy between an input ECG template and a reference ECG template, such that identification/authentication cannot be fully ruled out but the comparison is placed in doubt. The use of a capacitive touch sensor for finger print detection is known in the art, and is used in some smartphone electronic system locks or in fingerprint readers at border control posts and the like.

In the field of biometrics, an enrollment process is used in order to collect the biometric information needed for use as reference templates.

An enrollment process according to the present invention includes recording ECG information corresponding to a first plurality of user heartbeats for training the identification/classification system according to the present invention. With reference to apparatus 100 in FIG. 4, for example, a user U touches a finger 106a from each hand 106 to contacts 102, 104, respectively, until a desired number of N heartbeats is recorded. The heartbeats can be also indicated visually while recording, for example, on a wave tracing electronic screen in a known manner.

Registration of the identifying features of the ECG information taken from the first plurality of heartbeats is then refined by recording ECG information from a second plurality of user heartbeats taken from the user in the same enrollment session.

Preferably, the raw input ECG signal is subjected to pre-processing, consisting of one or both of baseline wander removal and signal de-noising (i.e., signal noise reduction), in part to address electrical background noise in the system, and also to eliminate or at least reduce physiological noise detected from muscle movements in the subject using the device (e.g., signals corresponding to stray fingertip movement across the detection sensors. The signal pre-processing could occur onboard in the interface apparatus 100 or off board, after transmitting the signal information, e.g., in a MATLAB computational environment.

First the raw signal is subject to a low pass filter (e.g., with a cutoff of 40 Hz).

Baseline drift (also sometimes referred to in the art as "baseline wander") in electrocardiogram (ECG) signals is another type of signal noise, and can be caused by factors such as respiration of the subject, variations in electrode impedance, and excessive movement of the subject during signal acquisition. Unless baseline wander is effectively removed, the accuracy of any feature extracted from the ECG, such as timing and duration of the ST-segment, is compromised. Noise from baseline wander is an important issue in ECG because it impedes accurate visual inspection of ECG waveform traces. Reducing the baseline drift to a near zero value also aids in computerized detection and delineation of the wave complexes.

Figure 4B:
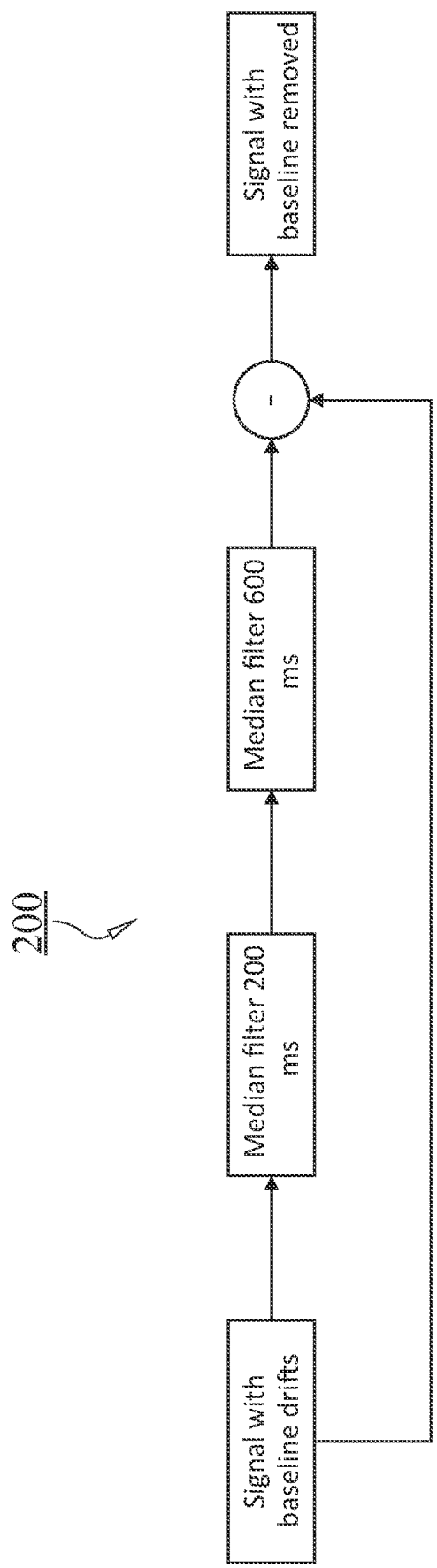
FIG. 4B is a flow diagram illustrating a filtering sequence to remove baseline drifts from a raw detected ECG input signal in the present invention.

According to the present invention, baseline drift can be eliminated using a sequence 200 of median filtering using the known MATLAB platform, as seen in FIG. 4B. For example, a 200 ms filter may be followed by a 600 ms filter, as illustrated.

Noise in the signal is further reduced by using Discrete Wave Transform (DWT) coefficients using Daubechies 4 wavelets. This approach is discussed in, for example, "Perfect Reconstruction Binomial QMF-Wavelet Transform," by Akansu et al. (Proc. SPIE Visual Communications and Image Processing, pp. 609-618, vol. 1360, Lausanne, Switzerland, 1990, the contents of which are incorporated herein by reference. This formulation is based on the use of recurrence relations to generate progressively finer discrete samplings of an implicit mother wavelet function; each resolution is twice that of the previous scale.

DWT can be preferable to conventional methods of eliminating electrical noise (compared with, for example, low-pass filters used with Fast Fourier transforms and the like), especially if the underlying signal is not stationary, with variable content over time.

The signal is further smoothed (i.e., increasing the precision of the data without distorting tendencies or trends in the signal) using a known approach such as Savitzky-Golvay filtering, using convolution, fitting successive subsets of adjacent data points with a low-degree polynomial using linear least squares. The approach is described, for example, by Savitzky and Golay in "Smoothing and Differentiation of Data by Simplified Least Squares Procedures". Analytical Chemistry. 36 (8): 1627-39, 1964, the contents of which are incorporated herein by reference in its entirety.

Figure 3:
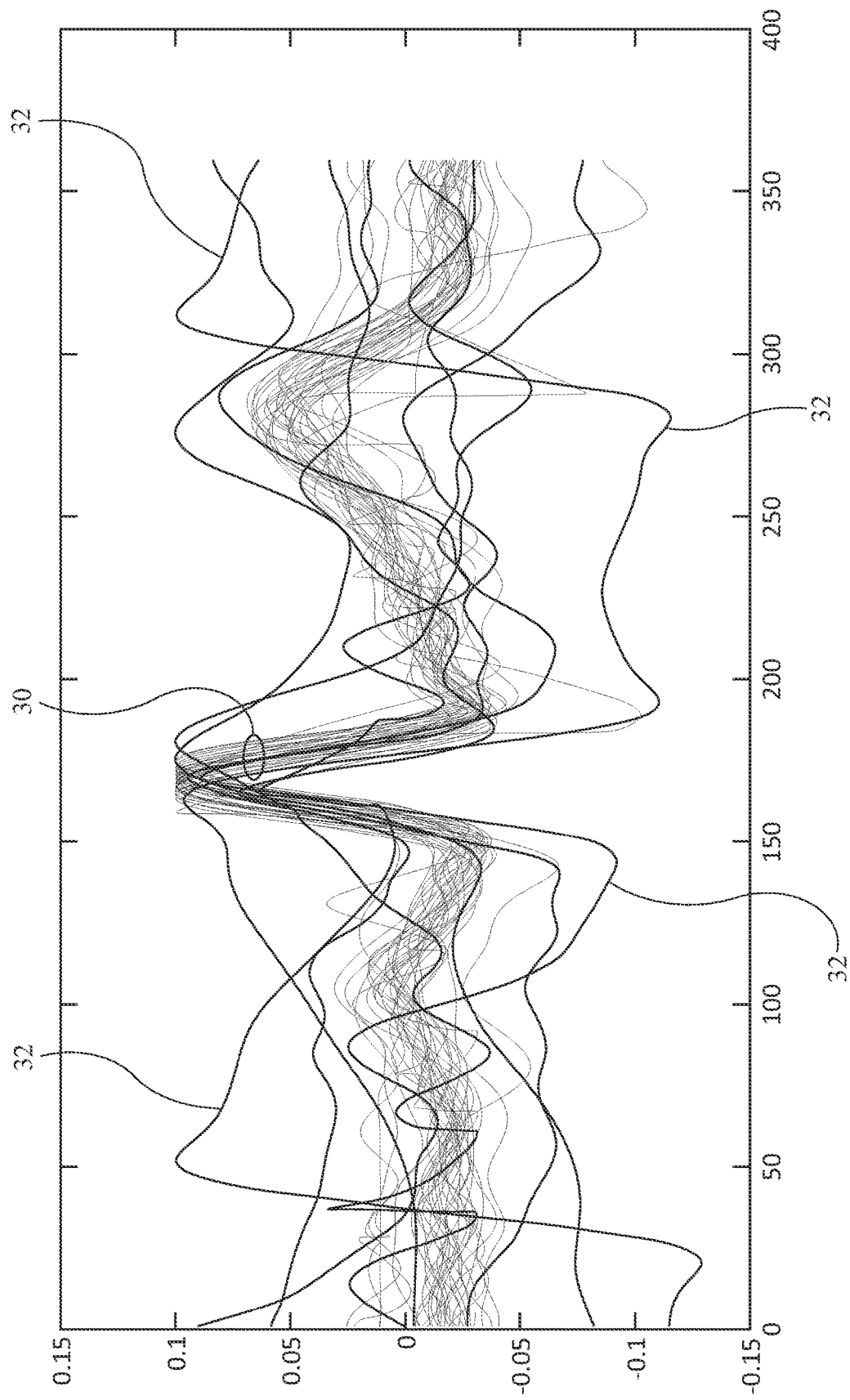
FIG. 3 schematically illustrates errant or false signals relative to a plurality of desirably detected QRS complex.

Muscle noise (from the stray finger movement and the like) are removed by filtering out portions where mathematical analysis indicates the derivative of the signal is relatively high, indicating a corresponding large slope of the signal curve, characteristic of a steep local spike. This kind of behavior can be seen, for example, in many of the noise signals 32 in FIG. 3.

Figure 1:
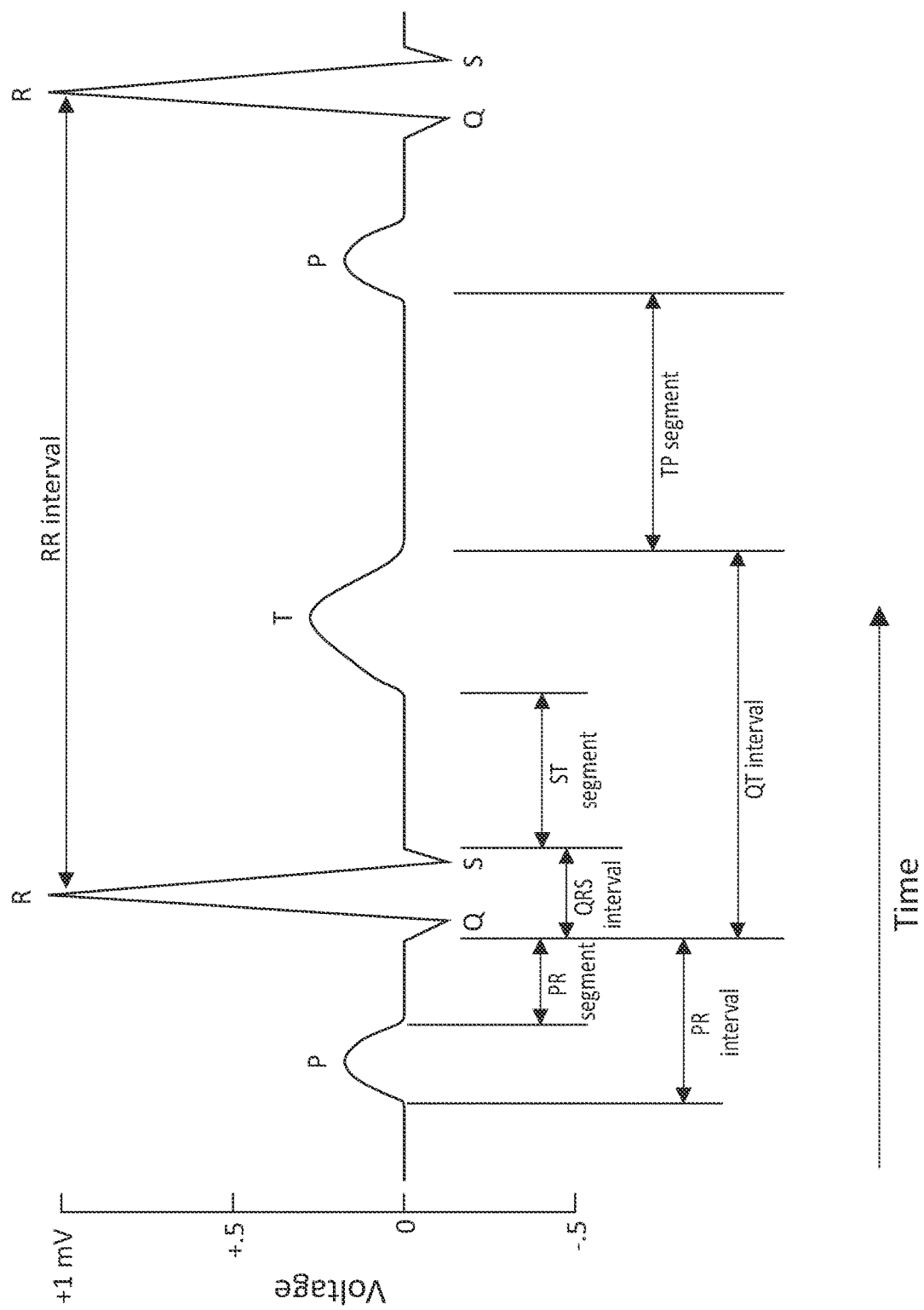
FIG. 1 illustrates a generic example of an ECG plot representing a first heartbeat and part of a second, including characteristic features thereof.
Figure 2:
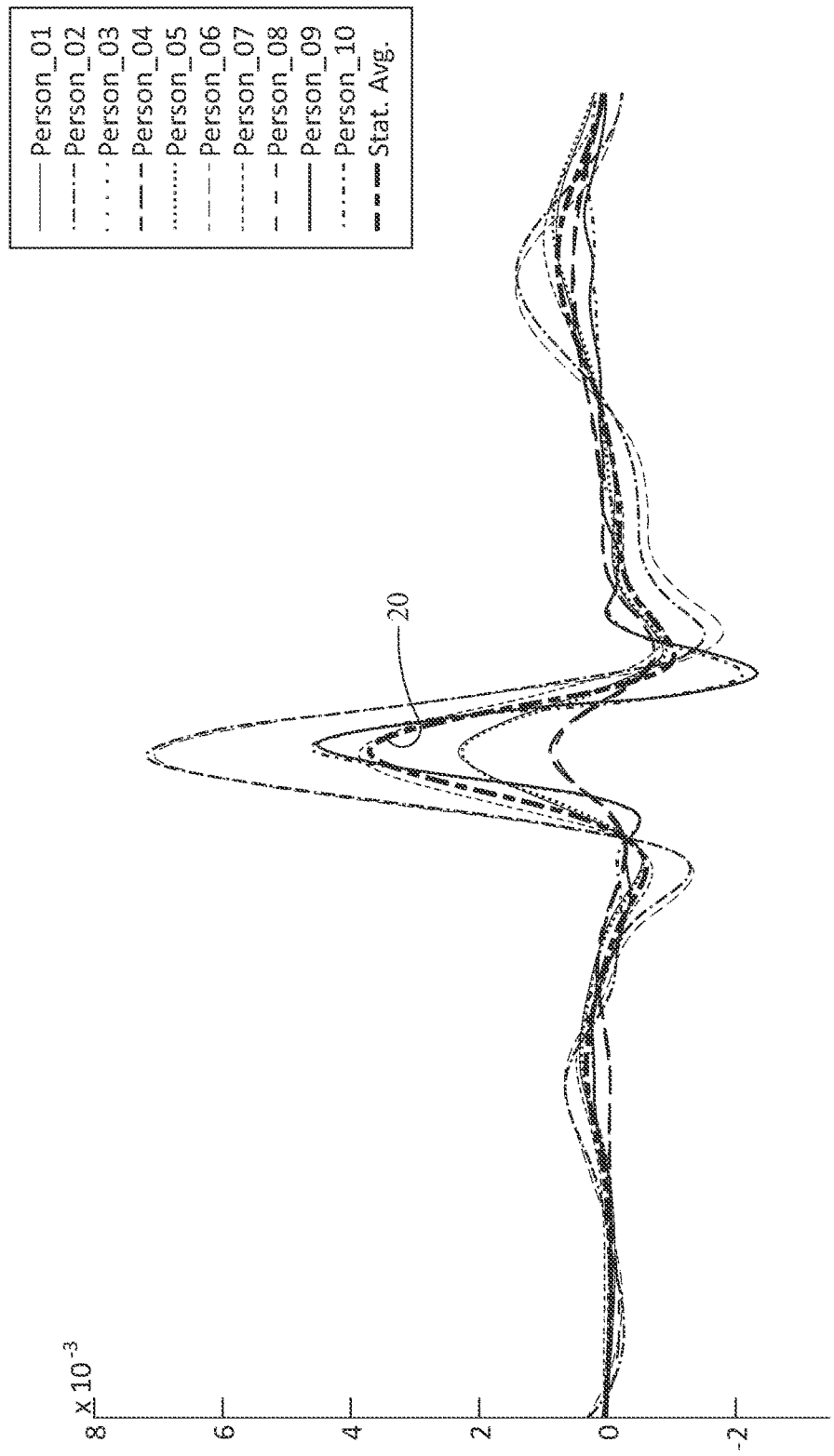
FIG. 2 schematically illustrates variations in ECG information recorded from a plurality of subjects, and an average (electrical potential over time) of the plurality of samples.

With reference to FIG. 1, the peak Q amplitude and time (with respect to the R peak), the R peak amplitude, the S peak amplitude and time (with respect to the R peak) are extracted from the reduced-noise signal, according to the present invention. An example of feature extraction according to the present invention includes locating R peaks in the pre-processed signal using the known Pan-Tompkins algorithm. See, for example, Pan and Tompkins in "A Real-Time QRS Detection Algorithm." *IEEE Transactions on Biomedical Engineering*. BME-32 (3): 230-236, March 1985, the complete contents of which are incorporated herein by reference.

The Pan-Tompkins algorithm is commonly used to detect QRS complexes in electrocardiographic signals (ECG). As previously discussed, the QRS complex represents ventricular depolarization and includes the main central R spike visible in an ECG signal (see FIG. 1). This feature makes it particularly suitable for measuring heart rate, the first way to assess the heart health state. As previously mentioned, the QRS complex is composed by a downward deflection (Q wave), a high upward deflection (R wave) and a final downward deflection (S wave).

The Pan-Tompkins algorithm applies a series of filters to highlight the frequency content of this rapid heart depolarization and removes the background noise. Then, it squares the signal to amplify the QRS contribution. Finally, it applies adaptive thresholds to detect the peaks of the filtered signal. Pan and Tompkins reported that 99.3% of QRS complexes were correctly detected using their algorithm.

Q and S peaks were extracted by mathematically locating signal minima in the interval of ±50 ms on either side of the R peak time, respectively. By way of example, an optimal part of the pre-processed signal for use according to the present invention is in a time interval in which the difference between R peak amplitudes does not exceed a predetermined threshold.

To obtain a signal to be worked with according to the present invention, M individual segments (where a "segment" is a full heartbeat cycle) are averaged. M may for be example two ECG segments. Thereafter, N (e.g., five) averaged ECG segments are extracted. In addition to the Q, R, and S peak amplitudes, and Q and S peak times, the first 25 Fourier coefficients of each N averaged ECG segments is also calculated.

The present invention uses a machine learning process to improve accurate extraction of ECG feature information from an input signal (which, as discussed above, is subject to noise and other extrinsic signals).

Figure 5:
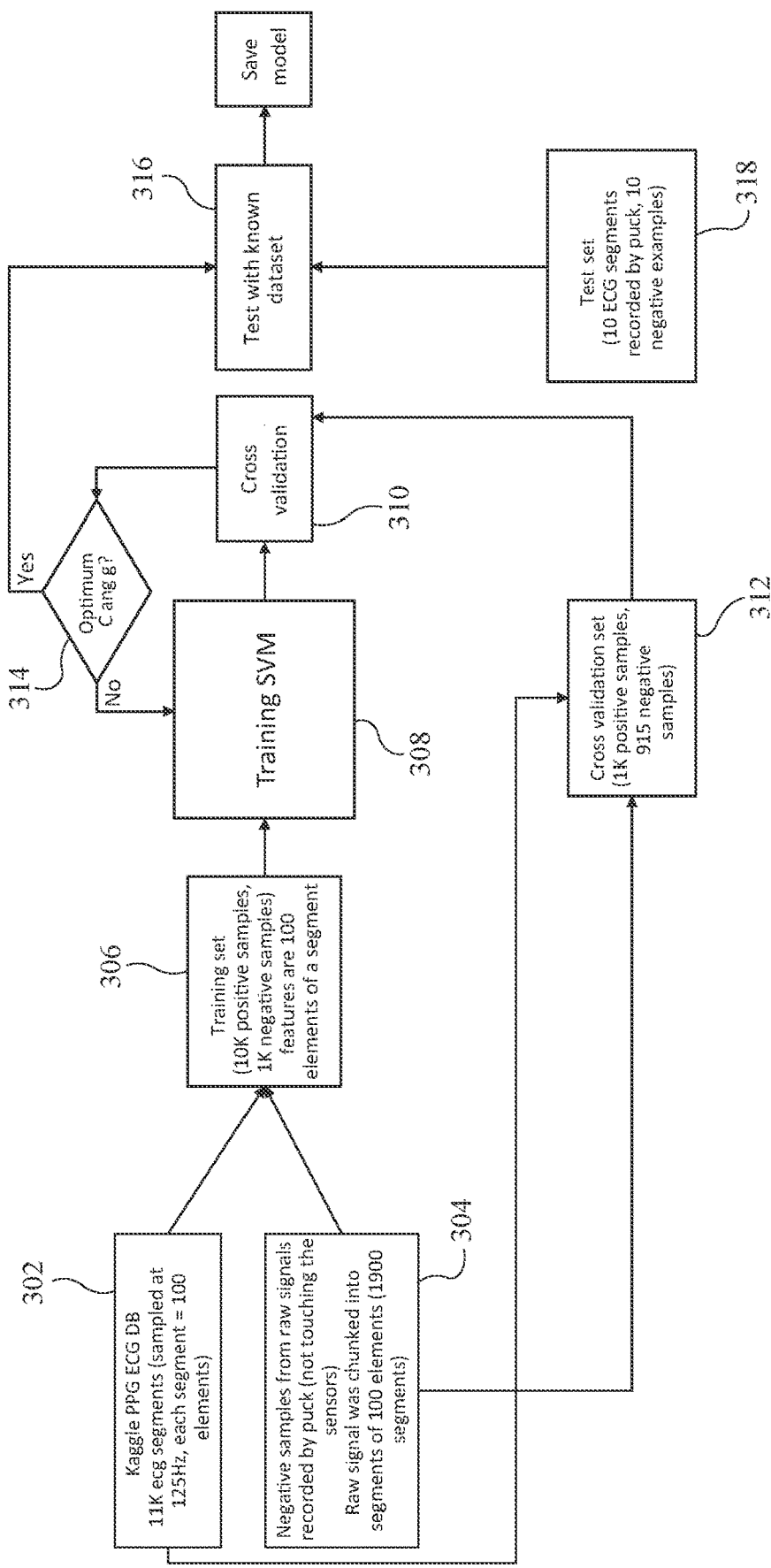
FIG. 5 is a high-level process diagram illustrating an example of machine learning for improving ECG element extraction.

FIG. 5 schematically illustrates at a high level a machine learning process 300 for initially training the system. This learning process can be referred to as "deep learning," in which instead of breaking down training sets of data to particular features, a large dataset universe is used with raw input (e.g., a 1-D signal or a 2-D image) to train a support vector machine (SVM) without having to extract features from the training data input.

In a particular example of the invention, a support-vector machine ("SVM") is used to develop a classification model by which true ECG features are distinguished from anomalies, using a body of training data to infer an appropriate basis for distinctions. See, for example, Fletcher, T., "Support Vector Machines Explained," (Mar. 1, 2009), for a general explanation (which text is fully incorporated by reference herein).

Given a set of training examples, each marked as belonging to one or the other of two categories (i.e., true ECG signals versus noise and the like), a SVM training algorithm builds a model that assigns new examples to one category or the other, making it a non-probabilistic binary linear classifier. An SVM model is a representation of the examples as points in space, mapped so that the examples of the separate categories are divided by a clear gap that is as wide as possible. New examples are then mapped into that same space and predicted to belong to a category based on which side of the gap they fall.

As illustrated in FIG. 5, an initial universe of data can be taken from, for example, 11,000 ECG segments (sampled at, for example, 125 Hz) taken from an open source of ECG samples (like the online open-source database Kaggle, for example) on the one hand (see 302), and negative samples (e.g., the electrical noise signal taken from the contacts 102, 104 in interface apparatus 100 without finger contact) (see 304).

A training set 306 for training the SVM can therefore be, for example, 10,000 positive ECG samples and 1,000 negative samples, taken from the respective initial universe of data above. This forms the basis for the SVM to build a model at 308 to classify detected signals as a positive sample (i.e., a useful ECG signal) or a negative sample (i.e., noise).

In order to evaluate the predictive model built by the SVM at 308, a second set of data 312 for statistical cross-validation is taken from initial data sets 302, 304 (e.g., 1,000 of the positive samples and 915 of the negative samples) and used in the SVM model at step 310.

If the statistical C-statistic and goodness of fit (g) of the cross-validation classification results are sufficient at 314, then the SVM model is finally tested at 316 with an actual ("real life") test set 318 of positive and negative samples (e.g., 10 ECG samples taken from the interface apparatus 100, and 10 negative samples).

If the cross-validation is deemed not sufficiently accurate at 314 ("no"), the process returns to the SVM training step 308, using additional new training set data to reinforce the SVM model.

Figure 6:
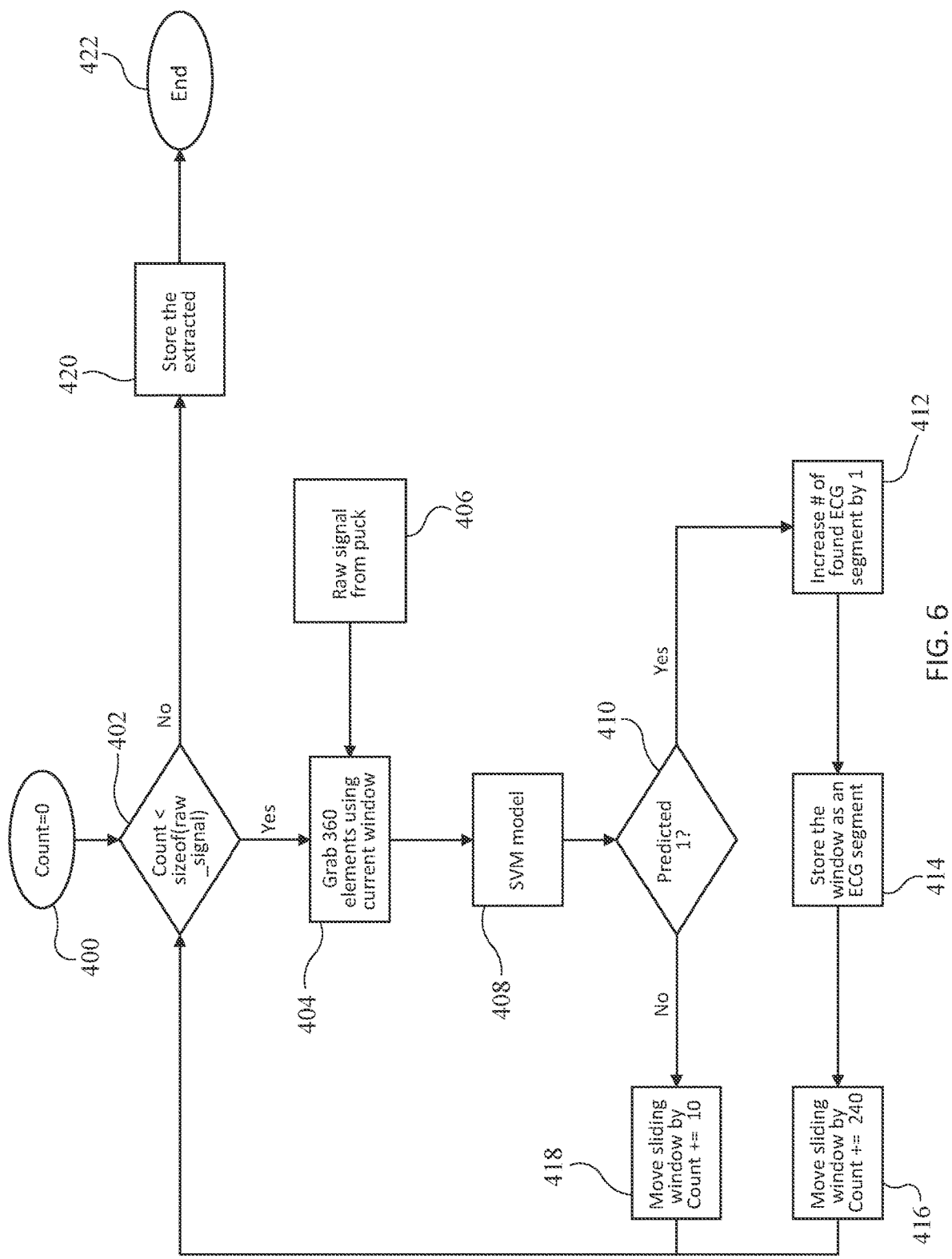
FIG. 6 illustrates a process of incrementally analyzing a raw input signal using the machine learning process of the present invention, particularly for identifying QRS interval features.

FIG. 6 illustrates a process of using the SVM for feature detection according to the present invention, and particularly in accordance with the SVM model built up according to FIG. 5.

In general, each raw input signal is considered as a plurality of sample segments of predetermined length as a function of time (usually a complete heartbeat cycle), usually determined as a function of sampling frequency, where each segment includes a certain number of elements (e.g., 100 elements).

The signal is indexed as a function of its overall size (i.e., length) and the process uses a sliding sample window or interval that "moves" along the signal, from which elements are taken from the signal for classification by the SVM model developed in FIG. 5.

Starting from a counter set at zero (400), the process checks to see if the counter is less than the overall size of the signal at 402 (i.e., the window is not at the end of the signal). At 404, a plurality of elements (e.g., 360 elements) are taken from the raw (but preprocessed) detected signal 406 (from the interface apparatus ("puck") 100) from within the window. That plurality of elements is tested at 408 according to the stored SVM model. If an ECG segment is predicted at 410 (i.e., "yes") the count of found ECG segments is increased by 1 at 412, and the window at that position is stored at 414 as an ECG segment. Then the window is indexed (i.e., moved forward) by a certain count (e.g., 240) at 416, and then the process returns to step 402.

If an ECG segment is not predicted at 410 ("no"), then the window is indexed forward at 418 by a smaller interval than that used if an ECG segment is predicted (here, for example, by 10), and the process again returns to step 402.

Once the window reaches the end of the signal (count≥size of raw signal in 402), the extracted ECG information is stored at 420. The extracted ECG information is a composite of the total number of segments captured. The process ends at 422.

Returning now to FIG. 3, it schematically illustrates a plurality 30 of ECG traces of interest (specifically, QRS intervals), relative to a plurality of random traces representing spurious noise, some of which are indicated at 32. The present invention contemplates a further level of probabilistic "clean up" in addition to the distinguishing operation of the SVM (sometimes referred to herein as "anomaly detection"). This is because the SVM model can still have "false positives" (i.e., signal segments identified as ECG segments by the SVM which are actually noise) because not all causes of noise can be technically accounted for.

Thus, anomaly detection in the present invention includes taking the stored ECG segments from 420 in FIG. 6 and fitting a Gaussian probability density function to a histogram of each element of an erstwhile extracted ECG segment from 420 (the histogram reflecting the number of elements within a given range of electrical potential). Recall here that an "element" as described herein is a subpart of a "segment."

For example: if $p(x)=\Pi_{i=1}^{100} p(x_i)$ is calculated, then if $p(x) < \in$ (i.e., when the probability that the segment is not a true ECG segment is not sufficiently high) where E is an empirically calculated error term, than the segment is discarded as a noise anomaly.

Figure 7:
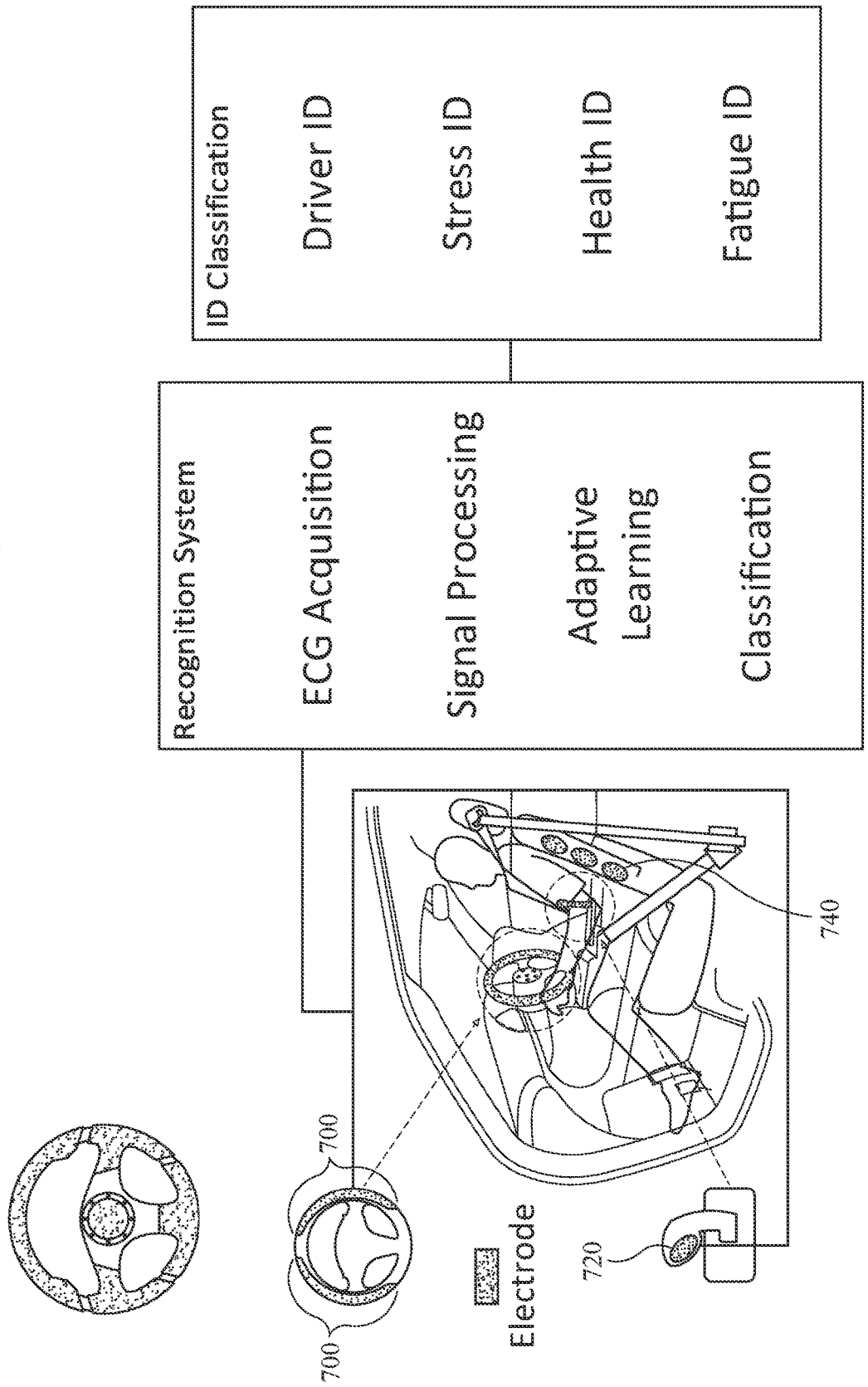
FIG. 7 illustrates an implementation of the present invention in a motor vehicle, in which electrodes or other suitable detectors of ECG information could be located in one or more of the steering wheel, a console gearshift, or even the seatback of the driver's seat.

FIG. 7 schematically illustrates an implementation of the present invention for use identifying, for example, an authorized driver for a motor vehicle. For example, following system enrollment (for example, using the interface apparatus 100 as discussed above) by an authorized driver, extracted data can be transferred by any operative mechanism to the motor vehicle for use in authorized driver authentication. For example, electrodes 700 for detecting ECG information could be placed along the circumference of the steering wheel, or an electrode 720 could be placed on a console-located gearshift. Electrodes 740 could even potentially be located in the seatback of the driver's seat.

In an extended application of the arrangement showing in FIG. 7, the detection of driver ECG information could potentially be also used to assess one or more of driver stress levels, driver fatigue, or other aspects of driver health (e.g., consciousness/drowsiness).

Figure 8:
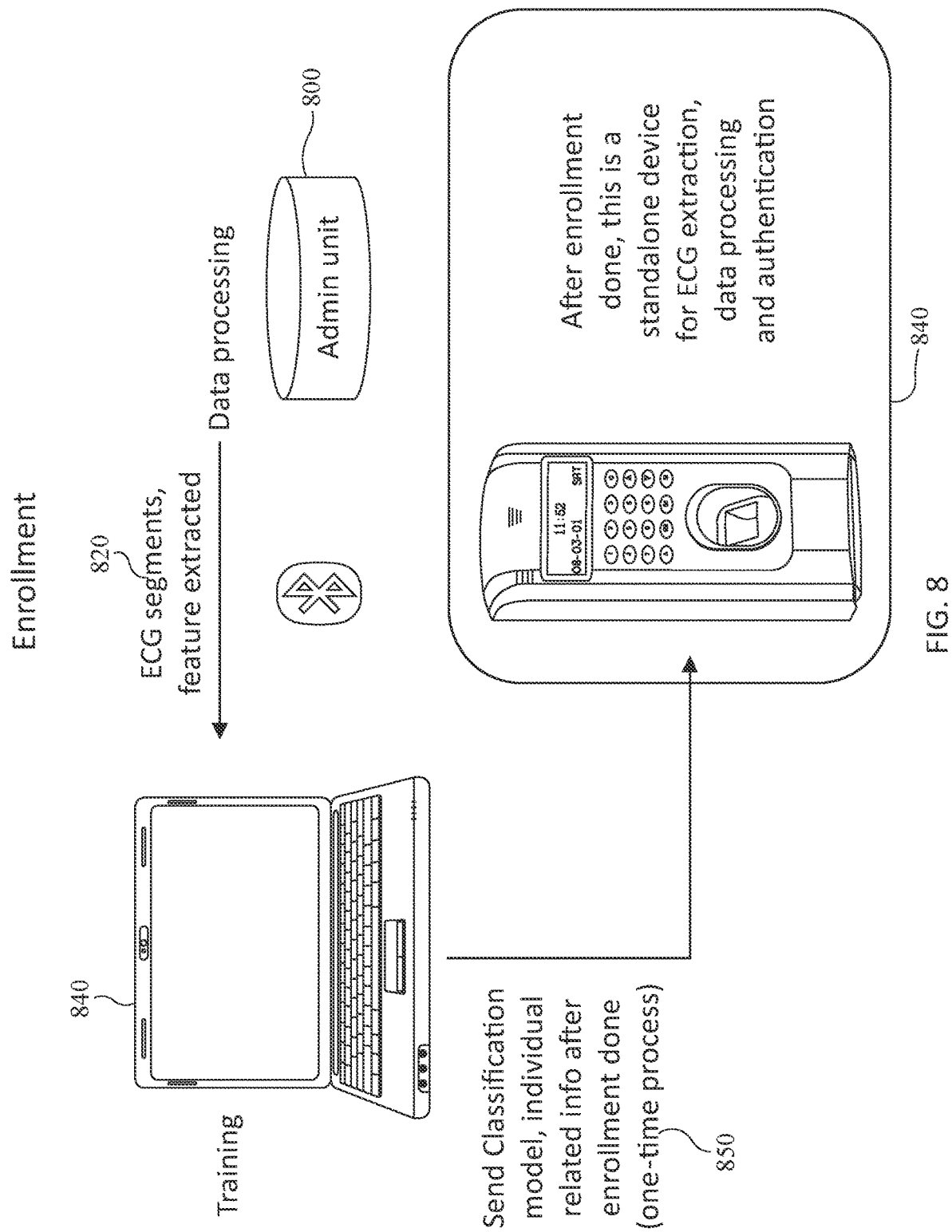
FIG. 8 illustrates a basic example of implementation of the present invention (e.g., for identity authentication for secured access entryways)

FIG. 8 illustrates a simple example of an implementation of the present invention between enrollment and use in authentication. For example, one or many users enroll (i.e., have their ECG information recorded for feature extraction as described above) via one or more suitable interface apparatuses 800 (essentially the apparatus 100 described previously). The collected ECG information is processed as described above, and ECG segments and feature extraction information 820 is transmitted to a central computer device 840, e.g., via Bluetooth or other known, preferably secure, protocol for data transmission. The development, training, and validation of the desired classification model (e.g., a support vector machine or a suitable neural network) takes place at central computer 820. Thereafter, the parameters of the trained classification model and accumulated enrollment information 850 is transmitted to a control terminal 840, suitably equipped to detect ECG information from a user (e.g., someone seeking to gain access to a secured entrance), process the detected ECG information, and authenticate the user using the relevant enrollment information. In a particular implementation, the terminal 840 is substantially stand-alone (e.g., in order to minimize avenues for illicitly accessing the terminal 840).

Figure 9:
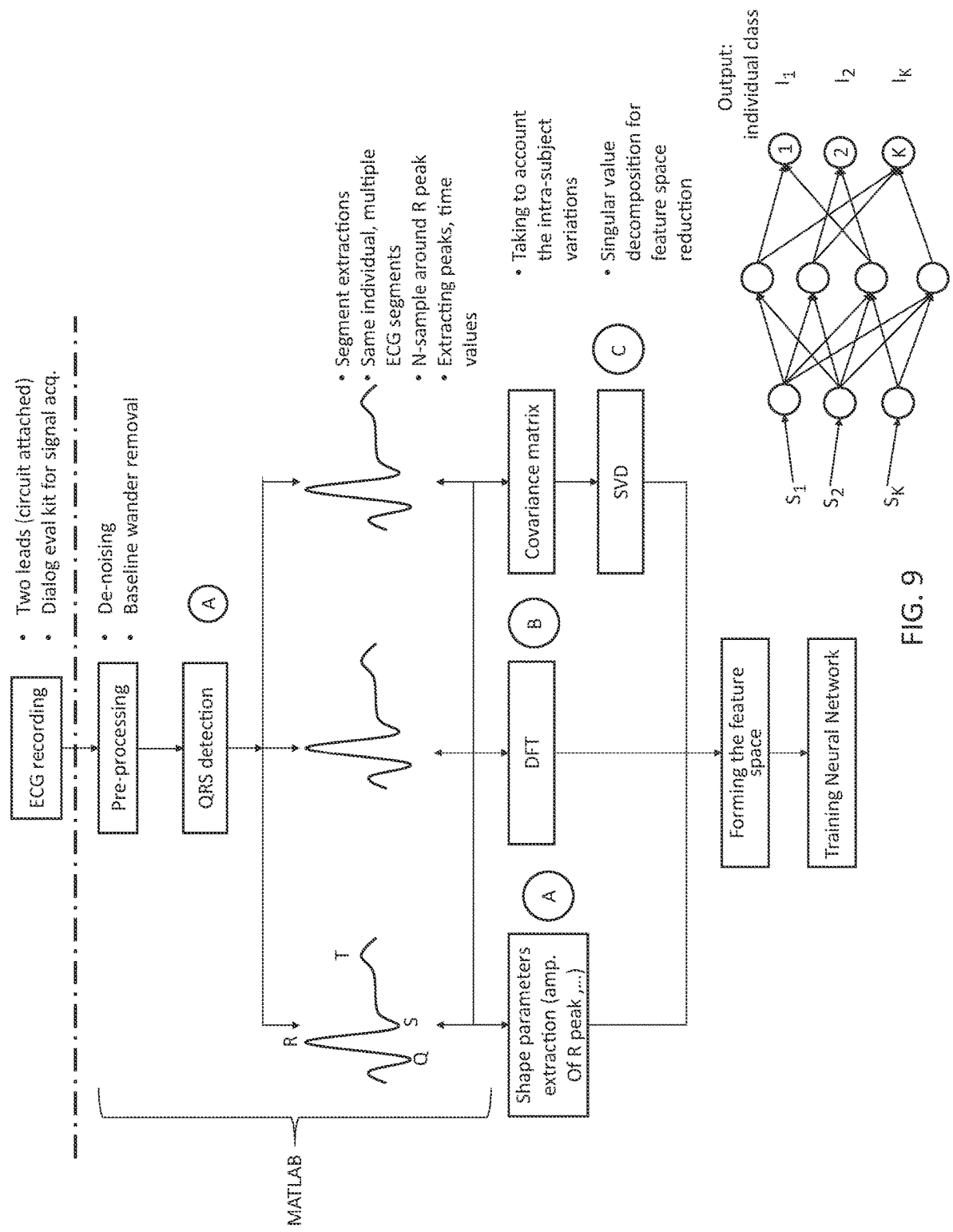
FIG. 9 illustrates a process according to an embodiment of the present invention for training a neural network.
Figure 10:
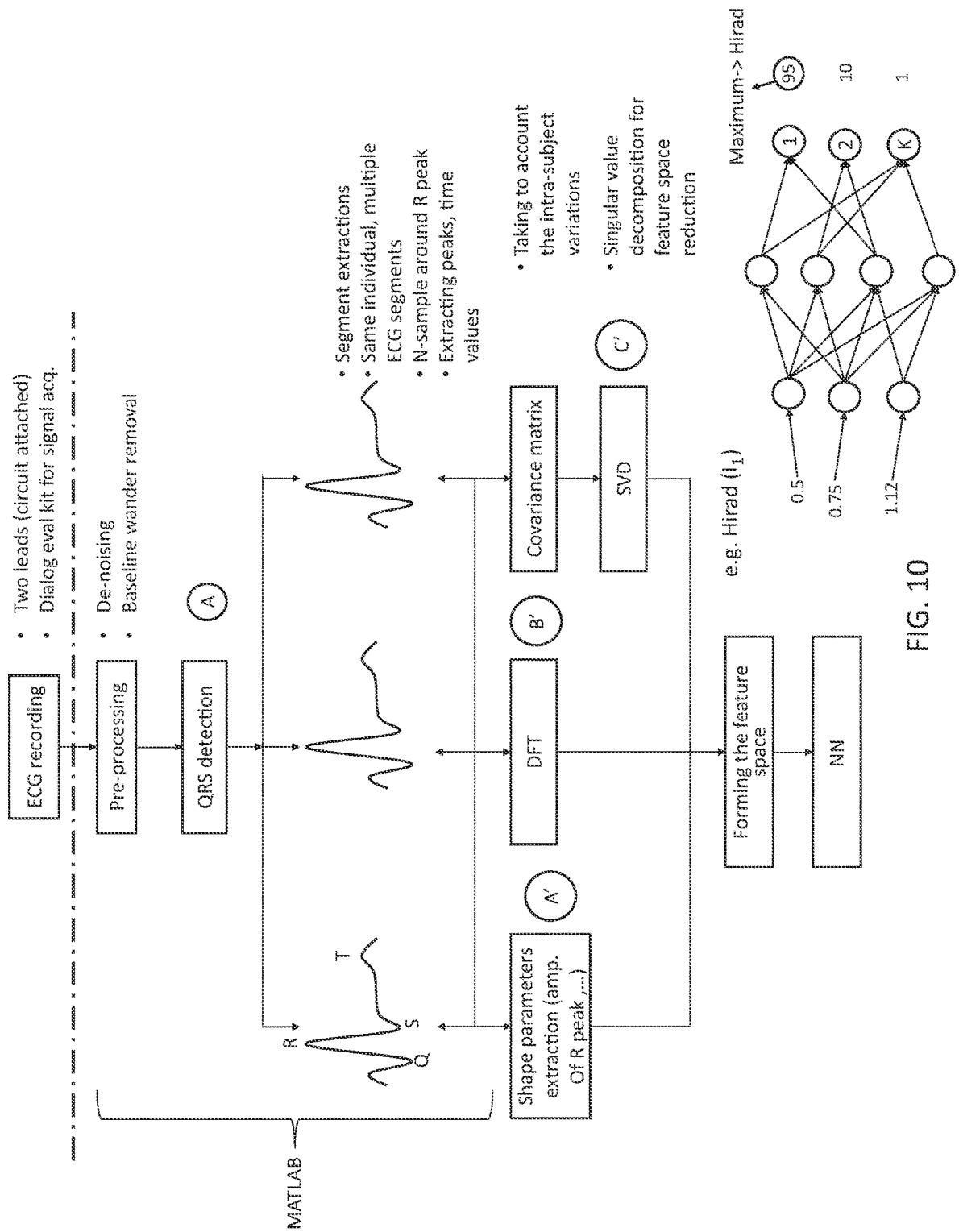
FIG. 10 illustrates a process according to an embodiment of the present invention for ECG feature detection using the trained neural network of FIG. 9.

FIGS. 9 and 10 illustrate enrollment, training, and applied use of an ECG feature detection system using a neural network that is trained for feature classification.

For example, a deep neural network structure uses a multi-layered network in which each layer is responsible for extracting a particular set of features from a working input. For example, in the present invention, a first layer A (left side of FIG. 9) extracts time-based shape features (e.g., peak amplitudes), a second layer B (center path of FIG. 9) captures frequency contents of the QRS peak (including timing information in the feature space), while a third layer C (right path of FIG. 9) extracts a combination of features like P-Q distances or R-R distances between ECG segments for a single subject (this takes into account changes of ECG segments over a longer period of time (instead of the time duration of a single segment), or under different physiological states of a given subject.

As additional ECG data is accumulated from the detection/authentication process (FIG. 10) it can be added to the training dataset for the neural network. In one example, a covariance matrix can be calculated with new detected data, such as for every detection. If the least square error between singular values of the new covariance matrix and the prior matrix is higher than a predetermined threshold (empirically estimated from the ECG dataset), then retraining the neural network is carried out with the new data. If not, the new data is stored in order to round out the dataset used for training in a future iteration.

Although the present invention is described above with reference to certain particular examples for the purpose of illustrating and explaining the invention, it must be understood that the invention is not limited solely with reference to the specific details of those examples. More particularly, the person skilled in the art will readily understand that modifications and developments that can be carried out in the preferred embodiments without thereby going beyond the ambit of the invention as defined in the accompanying claims.

What is claimed is:

1. A method of biometric authentication, comprising:
    receiving input electrocardiogram (ECG) signals from an individual claiming to be an authorized user;
    transferring the received input ECG signals to a computer processor;
    converting the input ECG signals into an input biometric template using the computer processor;
    comparing the input biometric template to a previously stored reference biometric template corresponding to previously received ECG signals from the authorized user;
    authenticating the individual claiming to be the authorized user as the authorized user based on the comparison of the input biometric template and the reference biometric template;
    wherein one or both of the previously received ECG signals from the authorized user and received input ECG signals from the individual claiming to be the authorized user undergo machine-learning based signal processing to distinguish true ECG signal elements from signal noise.

2. The method according to claim 1, wherein the machine-learning based signal processing is one of:
    using a support-vector machine (SVM) previously trained using a first plurality of generic ECG signals and a first plurality of noise signals to generate a classification model for distinguishing true ECG signal elements from signal noise; and using a trained neural network for ECG feature classification.

3. The method according to claim 2, wherein the training of the SVM further comprises refining the classification model generated by the SVM using a statistical cross-validation data set, the cross-validation data set comprising a second plurality of generic ECG signals and a second plurality of noise signals, wherein the second pluralities of generic ECG and noise signals are different from the first pluralities of generic ECG and noise signals.

4. The method according to claim 3, wherein cross-validation is repeated with new second pluralities of generic ECG signals and noise signals until the classification model achieves a desired level of statistical accuracy.

5. The method according to claim 4, wherein the desired level of statistical accuracy is considered in terms of a C-statistic and a goodness of fit.

6. The method according to claim 2, wherein the previously received ECG signals are obtained in increments by:
    subjecting an interval of an input signal within a window to classification by the SVM, wherein the window has a predetermined length and the input signal has an overall length;
    wherein if the input signal interval is classified as an ECG signal segment by the SVM then the input signal interval is stored as an ECG signal segment and the window is displaced by a first displacement along the length of the input signal, and if the input signal interval is identified as not being an ECG signal segment then the window is displaced by a second displacement along the length along the length of the input signal, wherein the second displacement is smaller than the first displacement;
    wherein the new input signal interval defined by the displaced window is subjected to SVM classification and the window is again displaced by a distance depending on whether or not the input signal interval is identified as an ECG signal segment, the displacement of the window being repeated until the window reaches or exceeds the end of the input signal.

7. The method according to claim 6, wherein each stored ECG signal segment is divided into a plurality of elements which are arranged in a histogram based on whether each segment falls into a given interval of electrical potentials and a Gaussian probability distribution function is fit to the histogram;
    wherein subsequent ECG signal segments obtained from the SVM classification are compared to the Gaussian probability distribution function to gauge the probability that a given subsequent ECG signal segment is indeed an ECG signal segment.

8. A system for authenticating an authorized driver of a motor vehicle, comprising:
    at least one input sensor for receiving input electrocardiogram (ECG) signals from an individual claiming to be an authorized driver of the motor vehicle;
    a computer processor constructed, arranged, and programmed to convert the received input ECG signals into an input biometric template, the processor being further constructed and arranged to compare the input biometric template to one or more previously stored reference biometric templates each associated with an authorized driver of the motor vehicle, each previously stored reference biometric template corresponding to previously received ECG signals from each respective authorized driver of the motor vehicle, wherein an individual claiming to be an authorized driver of the motor vehicle is authenticated based on the comparison on input and reference biometric templates;
    wherein one or both of the previously received ECG signals from the one or more authorized drivers of the motor vehicle and received input ECG signals from the individual claiming to be an authorized driver of the motor vehicle undergo machine-learning based signal processing to distinguish true ECG signal elements from signal noise.

9. The system according to claim 8, wherein the machine-based signal processing comprises using one of a trained neural network implemented in the computer processor, and a support vector machine (SVM) previously trained using a first plurality of generic ECG signals and a first plurality of noise signals to generate a classification model for distinguishing true ECG signals from noise signals, the support vector machine being implemented in the computer processor.

10. The system according to claim 9, wherein the training of the SVM further comprises refining the classification model generated by the SVM using a statistical cross-validation data set, the cross-validation data set comprising a second plurality of generic ECG signals and a second plurality of noise signals, wherein the second pluralities of generic ECG and noise signals are different from the first pluralities of generic ECG and noise signals.

11. The system according to claim 10, wherein cross-validation is repeated with new second pluralities of generic ECG signals and noise signals until the classification model achieves a desired level of statistical accuracy.

12. The system according to claim 8, wherein the at least one input sensor is provided in one or more a periphery of the motor vehicle steering wheel, a gearshift handle, and the seatback of the driver's seat.

13. The system according to claim 12, wherein the computer processor is additionally constructed, arranged, and programmed detect and monitor one or more of driver health, driver stress, and driver drowsiness.

14. The method according to claim 2, wherein the trained neural network is a deep neural network having multiple layers, each layer being responsible for extracting a particular set of features from an ECG signal.

15. A biometric authentication device comprising:
    a plurality of electrode sensors sized, constructed, and arranged for receiving input ECG signals from an individual claiming to be a known user;
    a processor operably connected to the plurality of electrode sensors and constructed and arranged for processing the received input ECG signals; and
    a memory operably connected with the processor and including processor instructions for:
        converting the received input ECG signals into an input biometric template;
        comparing the input biometric template to a previously stored reference biometric template corresponding to previously received ECG signals from the known user; and
        authenticating the individual as the known user based on the comparison of the input biometric template and the reference biometric template;
    the memory further including processor instructions for machine-learning based signal processing of at least one of the previously received ECG signals from the known user and the received input ECG signals from the individual being authenticated to distinguish true ECG signal elements from signal noise.

16. The device according to claim 15, further comprising a biosensor operably between the plurality of electrode sensors and the processor and constructed and arranged for pre-processing the received input ECG signal.

17. The device according claim 15, wherein the machine-learning based signal processing is one of:
  using a support-vector machine previously trained using a first plurality of generic ECG signals and a first plurality of noise signals to generate a classification model for distinguishing true ECG signal elements from signal noise; and
  using a trained neural network for ECG feature classification.

18. The device according to claim 15, wherein:
  the plurality of electrode sensors are also sized, constructed, and arranged for receiving ECG signals from the known user; and
  the memory additionally includes processor instructions for: converting the ECG signals from the known user into the reference biometric template; and machine-learning based signal processing of the ECG signals from the known user to distinguish true ECG signal elements from signal noise.

19. The device according to claim 15, further comprising a power source constructed and arranged to supply power to the authentication device.

20. The device according to claim 15, wherein the plurality of electrode sensors are capacitive touch sensors constructed and arranged to additionally function as fingerprint scanners.

21. The device according to claim 15, wherein the device is a single structural unit comprising therein the assembly of the plurality of electrode sensors, the processor, and the memory.

* * * * *

UNITED STATES PATENT AND TRADEMARK OFFICE
CERTIFICATE OF CORRECTION

PATENT NO. : 12,050,672 B2  
APPLICATION NO. : 17/480296  
DATED : July 30, 2024  
INVENTOR(S) : Rocco Stefano and Hirad Karimi Page 1 of 1

It is certified that error appears in the above-identified patent and that said Letters Patent is hereby corrected as shown below:

In the Drawings

All on Sheet 8 (Figure 6): Reference numerals 400, 402, 404, 406, 408, 410, 412, 414, 416, 418, 420, and 422, should be replaced by new reference numerals 600, 602, 604, 606, 608, 610, 612, 614 616, 618, 620, and 622, respectively.

In the Specification

Replace the text between Column 8, Line 49 and Column 9, Line 3 with the following text:
  Starting from a counter set at zero (600), the process checks to see if the counter is less than the overall size of the signal at 602 (i.e., the window is not at the end of the signal). At 604, a plurality of elements (e.g., 360 elements) are taken from the raw (but preprocessed) detected signal 606 (from the interface apparatus ("puck") 100) from within the window. That plurality of elements is tested at 608 according to the stored SVM model that has been established according to the explanation above. If an ECG segment is predicted at 610 (i.e., "yes") the count of found ECG segments is increased by 1 at 612, and the window at that position is stored at 614 as an ECG segment. Then the window is indexed (i.e., moved forward) by a certain count (e.g., 240) at 616, and then the process returns to step 602.
  If an ECG segment is not predicted at 610 ("no"), then the window is indexed forward at 618 by a smaller interval than that used if an ECG segment is predicted (here, for example, by 10), and the process again returns to step 602.
  Once the window reaches the end of the signal (count ≥ size of raw signal in 602), the extracted ECG information is stored at 620. The extracted ECG information is a composite of the total number of segments captured. The process ends at 622.

In the text at Column 9, Line 16 and at Column 9, Line 19, replace the reference numeral 420 with the reference numeral 620.

Signed and Sealed this  
Twenty-second Day of April, 2025

Coke Morgan Stewart  
*Acting Director of the United States Patent and Trademark Office*